Figure 1:
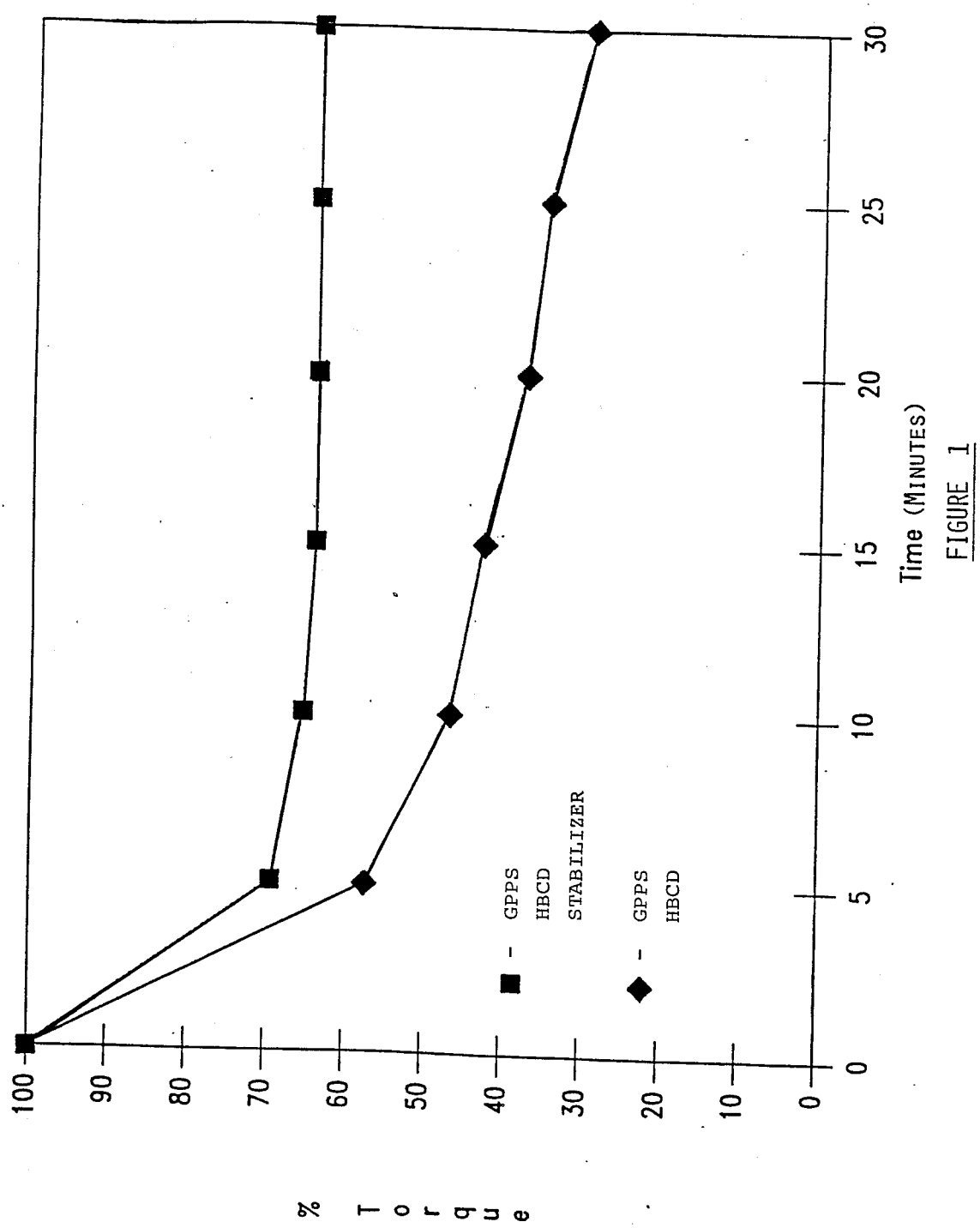

United States Patent [19]

Schleifstein

[11] Patent Number: 4,963,606

[45] Date of Patent: Oct. 16, 1990

[54] THERMALLY STABILIZED STYRENIC POLYMER-BASED THERMOPLASTIC FORMULATIONS

[75] Inventor: Robert A. Schleifstein, Edison, N.J.

[73] Assignee: Ethyl Corporation, Richmond, Va.

[21] Appl. No.: 403,405

[22] Filed: Sep. 6, 1989

[51] Int. Cl.$^5$ .............................................. C08K 5/58
[52] U.S. Cl. ................................... 524/180; 524/291;
524/342; 524/343; 524/377; 524/386; 524/387;
524/467
[58] Field of Search ............... 524/386, 387, 342, 467,
524/180, 181, 343, 377

[56] References Cited

U.S. PATENT DOCUMENTS

| | | | |
|---|---|---|---|
| 3,004,935 | 10/1961 | Raley et al. | 524/467 |
| 3,026,264 | 3/1962 | Rocklin | 524/343 |
| 3,849,371 | 11/1974 | Wolford et al. | 524/467 |
| 4,089,912 | 5/1978 | Levek et al. | 524/371 |
| 4,219,605 | 8/1980 | Rohringer | 524/179 |
| 4,532,287 | 7/1985 | Bill et al. | 524/371 |

OTHER PUBLICATIONS

Antec 1985, 989–996 (Klender et al.).
Encyclopedia of Polymer Science and Technology, vol. 12, Wiley-Interscience Publishers, 1970, pp. 725–768.
Encyclopedia of Polymer Science and Technology, vol. 13, Wiley-Interscience Publishers, 1970, pp. 395–425.
Kirk-Othmer Encyclopedia of Chemical Technology, 3rd Ed., vol. 3, Wiley-Interscience Publishers, New York, pp. 128–148.
Kirk-Othmer Encyclopedia of Chemical Technology, 3rd Ed., vol. 12, Wiley-Interscience Publishers, New York, pp. 225–249.

*Primary Examiner*—Veronica P. Hoke
*Attorney, Agent, or Firm*—E. E. Spielman, Jr.; David E. LaRose

[57] ABSTRACT

This invention relates to a styrenic polymer-based thermoplastic formulation containing a brominated cycloaliphatic flame retardant and a thermal stabilizer system comprising an organotin stabilizer, a hindered phenolic antioxidant and, optionally, a polyhydroxy aliphatic compound.

11 Claims, 1 Drawing Sheet

THERMALLY STABILIZED STYRENIC POLYMER-BASED THERMOPLASTIC FORMULATIONS

BACKGROUND OF THE INVENTION

This invention relates to thermally stabilized styrenic polymer-based thermoplastic formulations containing brominated cycloaliphatic flame retardants.

Styrenic polymers are usually classified as general-purpose polystyrene (GPPS) or as impact modified polystyrene (IPS). GPPS is a high molecular weight ($\overline{M}_w$=200–300,000) clear polymer which is hard, rigid and free of odor and taste. It finds use in producing moldings, extrusions and films. IPS is a rubber-modified polystyrene which is characterized by its toughness and resistance to abuse. The rubber is dispersed in the polystyrene matrix in the form of discrete particles. IPS is not clear, but rather, is either translucent or opaque depending upon the amount of rubber used. The art recognizes two types of IPS, i.e., medium-impact polystyrene (MIPS) and high-impact polystyrene (HIPS), the former containing less rubber than the latter.

Styrenic polymers can be injection molded, extruded, thermoformed, etc. Also, styrenic polymer-based thermoplastic formulations can be prepared which incorporate blowing agents, such as pentane or hexane, to yield an expanded or a foamed product. Generally, the foamed product uses GPPS.

Both GPPS and IPS enjoy wide acceptance in the marketplace. With this acceptance has come many applications which require flame retardancy. One type of flame retardant recommended for use with GPPS and IPS is brominated cycloaliphatics, e.g., tetrabromocyclooctane and hexabromocyclododecane (HBCD). The HBCD is generally a mixture of solid HBCD isomers. The isomer identities and their amounts are determinative of whether the HBCD is a low-melt product having a melting point range within the range of from about 168° C. to about 185° C., for example a melting point of 172–184° C., or a high melt product having a melting point range within the range from about 185° C. to about 205° C., for example a melting point of 185–195° C. or a melting point of 200–205° C. Other isomeric mixtures are possible to provide different melting points.

While brominated cycloaliphatics are excellent flame retardants, their presence in styrenic polymer-based thermoplastic formulations can cause serious color and/or viscosity problems if the thermoplastic formulations are exposed to the high temperatures which are used in some article or film forming techniques.

THE INVENTION

This invention relates to thermally stabilized, flame retardant, styrenic polymer-based thermoplastic formulations which do not suffer significant color and/or viscosity degradation under conventional injection or extrusion molding conditions.

The thermoplastic formulations of this invention comprise general-purpose polystyrene (GPPS) or impact-modified polystyrene (IPS); a flame retardant amount of a brominated cycloaliphatic compound; and a thermal stabilizer system comprised of (i) from about 2 to about 10 weight percent of an organotin stabilizer, (ii) from about 1 to about 3 weight percent of a hindered phenolic antioxidant, and, optionally, (iii) from about 1.5 to about 5 weight percent of polyhydroxy aliphatic compound which is capable of chelating transition metals which may be in said thermoplastic formulation. All weight percents referred to above are based upon the total weight of the brominated cycloaliphatic compound used in the formulation.

FIG. 1 is a graph of % Torque values vs Time for a thermoplastic formulation containing a stabilizer system of the invention and for a thermoplastic formulation not containing such system.

For the purposes of this invention, the GPPS and the IPS may be homopolymers, copolymers or block polymers and formed from such vinyl aromatic monomers as styrene, ring-substituted methylor polymethylstyrenes, ring-substituted ethyl- or polyethylstyrenes, ring-substituted propyl- or polypropylstyrenes, ring-substituted butyl- or polybutylstyrenes, ring-substituted mixed polyalkylstyrenes wherein the alkyl groups differ from each other, ring-substituted chloro-, bromo- or bromochloropolystyrenes, ring-substituted alkyl or polyalkylchloro-, polyalkylbromo- or polyalkylbromochloro- styrenes in which the alkyl group(s) contain(s) from one to four carbon atoms, alphamethylstyrene, ring-substituted methyl- or polymethyl-alphamethylstyrenes, propyl- or polypropyl-alpha-methylstyrenes, butyl- or polybutyl-alpha-methylstyrenes, ring-substituted mixed polyalkyl-alpha-methylstyrenes wherein the alkyl groups differ from each other, ring-substituted chloro- or polychloro-alphamethylstyrenes, ring-substituted alkyl- or polyalkylchloro- or polychloro-alphamethylstyrenes in which the alkyl group(s) contain(s) from one to four carbon atoms, and similar polymerizable styrenic monomers—i.e., styrenic compounds capable of being polymerized by means of peroxide or like catalysts into thermoplastic resins. Homopolymers and copolymers of simple styrenic monomers (e.g., styrene, p-methyl-styrene, 2,4-dimethylstyrene, alpha-methylstyrene, p-chloro-styrene, etc.) are preferred from the standpoints of cost and availability.

The IPS may be either medium impact polystyrene (MIPS) or high impact polystyrene (HIPS) and are conventional. The rubber used in effecting impact modification is most often a butadiene rubber.

The styrenic polymer-based thermoplastic formulations will generally contain from 50 weight percent to about 95 weight percent GPPS or IPS.

The brominated cycloaliphatic flame retardant constituent of the thermoplastic formulations of the invention are exemplified by tetrabromocyclooctane, hexabromocyclododecane, dibromoethyldibromocyclohexane, dibromomethyl dibromocyclopentane, pentabromonochlorocyclohexane, hexabromocyclohexane, tetrabromotrichlorocyclohexane and the like. Preferred brominated cycloaliphatics are tetrabromocyclooctane and low melt and high melt hexabromocyclododecane. Most highly preferred are hexabromocyclododecane products having individual melting point ranges of about 170° C.–184° C., of about 172° C.–184° C., of about 175° C.–190° C., of about 185° C.–195° C., of about 185° C.–193° C., of about 198° C.–205° C., 201° C.–205° C., or of about 198° C.–202° C.

The flame retardant amount of brominated cycloaliphatic compound used is dependent upon the compound selected, obtainment of a UL-94 rating of V-2, cost considerations, whether or not the thermoplastic formulation contains a flame retardant synergist, e.g. $Sb_2O_3$, whether or not the article formed from the thermoplastic formulation is expanded or not, and any adverse effect that the compound may have on the physical properties of the thermoplastic formulation. Generally, practitioners in the art rely upon an empirical approach in determining the flame retardant amount which best suits their needs. If the thermoplastic formulation is for use in forming non-expanded article then a suitable flame retardant amount is within the range of from about 5 to about 12 weight percent. If no flame retardant synergist is used, an amount within the range of from about 2.5 to about 5 weight percent is used.

When the thermoplastic formulation is suitable for and is used to produce expanded, i.e., foamed articles, the brominated cycloaliphatic compound can provide flame retardation when used in an amount within the range of from about 0.5 to about 3.0 weight percent. Generally, there is little benefit in using flame retardant synergist, e.g., $Sb_2O_3$, for expanded articles.

Heretofore, attempts to reduce the flame retardant amount of brominated cycloaliphatics needed by incorporating antimony oxide synergists, e.g. $Sb_2O_3$, in styrenic polymerbased thermoplastic formulations were not considered to be desirable as such incorporation usually accelerated degradation of the formulation under high temperature conditions. Now, however, with the thermal stabilizer systems of this invention, it is possible to reduce the flame retardant amount of brominated cycloaliphatic needed by using antimony oxide synergist without the usually expected concomitant degradation. The amount of antimony oxide synergist used is determined empirically and will generally fall within the range of from about 0.5 to about 2 weight percent. Preferred amounts are within the range of from about 1 to about 1.5 weight percent.

Preferred formulations will contain from about 2.5 to about 7 weight percent hexabromocyclododecane and from about 0.75 to about 1.25 weight percent $Sb_2O_3$ or from about 2.5 to about 7 weight percent tetrabromocyclooctane and from about 0.75 to about 1.25 weight percent $Sb_2O_3$.

All of the foregoing weight percent ranges given above with respect to the brominated cycloaliphatic flame retardant and the flame retardant synergist are based upon the total weight of the thermoplastic formulation.

The organotin stabilizer constituent of the thermal stabilizer system of this invention can be most any of the art recognized organotin stabilizers. For, example the organotin stabilizer can be: dibutyltin dilaurate; dibutyltin maleate; (maleoxyldioxy)-bis[dibutyl(lauroyloxy)tin]; dibutyltin bis(n-alkyl maleate), the alkyl usually is $C_4$ or $C_8$; dibutyltin bis(lauryl mercaptide); thiabis(monobutyltin sulfide); dibutyltin sulfide; dimethyltinbis(isooctyl mercaptoacetate), also the analogous dibutyltin- and di-n-octyltin-derivatives thereof; dimethyltin bis($\beta$-alkanoyloxyethylmercaptide); dibutyltin-$\beta$-mercaptopropionate, also the analogous di-n-octyltin-derivative thereof; thiabismonomethyltin-bis($\beta$-alkanoyloxyethylmercaptide); and the like.

The most preferred organotin stabilizers are the alkyltin mercaptides of the formula $(R)_2Sn(SR')_2$ wherein R is an alkyl group containing 4 to 8 carbon atoms and R' is an alkyl group containing 8 to 14 carbon atoms. A most highly preferred organotin stabilizer is dibutyltinbis(dodecamercaptide).

The organotin stabilizer is used in an amount sufficient to prevent significant color degradation without causing significant loss in viscosity. This amount is best determined by empirical methods. Generally, from about 2 weight percent to about 10 weight percent organotin, based upon the weight of the brominated cycloaliphatic flame retardant used, is suitable. When the organotin stabilizer is of the formula $(R)_2Sn(SR')_2$, from about 4 to about 6 weight percent is preferred.

The hindered phenolic antioxidant constituent of the thermal stabilizer system is preferably 1,3,5-trimethyl-2,4,6-tris(3,5-di-tert-butyl-4-hydroxybenzyl)benzene. This antioxidant can be obtained from Ethyl Corporation as ETHANOX ® 330 antioxidant. Other suitable antioxidants are those which are art-recognized as antioxidants available for use in thermoplastic formulations. Exemplary of such are: 2,6-di-tert-butyl-p-cresol; 2,2'-methylenebis(4-methyl-6-tert-butylphenol); 4,4'-butylidenebis(6-tert-butyl-m-cresol); 1,1,3-tris(2-methyl-4-hydroxy-5-tert-butyl-phenyl)butane; 4,4'-methylenebis(2,6-di-tert-butylphenol); octadecyl 3-(3,5-di-tert-butyl-4-hydroxyphenyl)propionate; 2,6-di(1-methylheptadecyl)-p-cresol; tetrakis[methylene 3-(3',5'-di-tert-butyl-4'-hydroxyphenyl)-propionate]methane; and 4,4'-cyclohexylidene-bis(2-cyclohexylphenol).

The amount of antioxidant used is that amount which is found sufficient to prevent significant viscosity degradation (melt viscosity) of the thermoplastic formulation. Generally, an antioxidant amount within the range of from about 1 weight percent to about 3 weight percent, based upon the weight of the brominated cycloaliphatic flame retardant, will be sufficient. A preferred range is from about 1.5 weight percent to about 2.5 weight percent. For the preferred 1,3,5-trimethyl-2,4,6-tris-(3,5-di-tert-butyl-4-hydroxybenzyl)benzene an amount within the range of from about 1.75 weight percent to about 2.25 weight percent is suitable.

The optional polyhydroxy aliphatic constituent of the thermal stabilizer system is one which is capable of chelating transition metals which may be present in the thermoplastic formulation. If such metals are not present, then this optional constituent is not needed. These metals are usually present as impurities, or as constituents of lubricants added to the formulation. Exemplary metals are iron, manganese, zinc and the like. If these metals are not chelated they can significantly contribute to color degradation. The polyhydroxy aliphatics most suitable for use in this invention are those having at least 2, and preferably at least 3, hydroxy groups and 3 to 15 carbon atoms. Examples are, pentaerythritol, dipentaerythritol, tripentaerythritol, glycerol, trimethylolpropane, trimethylolethane, etc. Of these, trimethylolpropane, trimethylolethane, dipentaerythritol, and tripentaerythritol are preferred. Most highly preferred is trimethylolethane.

The amount of polyhydroxy aliphatic used is dependent to some extent upon the metal content of the thermoplastic formulation. In most instances, from about 1.5 to about 6 weight percent is suitable, with from about 2 to about 5 weight percent being most preferred. These weight percentages are based upon the weight of the brominated cycloaliphatic flame retardant used in the formulation.

The thermoplastic formulations of this invention can be conventionally prepared using art-recognized blending equipment, e.g., a Brabender mixer. The various constituents can be added to the selected piece of equipment one at a time, all at once or in any combination.

Conventional molding techniques, e.g., injecting molding, extrusion, etc., can be performed on the thermoplastic formulations of the invention to form articles therefrom. The articles so formed will not show the results of significant color and viscosity degradation which one skilled in the art would normally expect when using such techniques on GPPS or IPS which has been flame retarded with a brominated cycloaliphatic.

The thermoplastic formulations may also contain conventional additives, such as, pigments, fillers, dyes, plasticizers, anti-static agents, processing aids and the like.

The following Examples are illustrative of the invention and are not to be taken as limiting the scope thereof.

EXAMPLE I

The following procedure was utilized to obtain the data points used in the graph depicted in FIG. 1. The percent torque values represent the torque, as grammeters, measured at each indicated time interval for each sample divided by the torque measured for neat GPPS at the same indicated time interval and multiplied by 100.

Procedure

To the mixing bowl of a Brabender Type PL-V150 Plasti-corder (C. W. Brabender Instrument, Inc.) was added 50 grams of general purpose polystyrene (GPPS). The Brabender had been previously preheated to 200° C. After a melt had formed, the Brabender was set at 66 rpm mixing speed. To measure the torque required to maintain this mixing speed over time, the Brabender motor was equipped with a measuring head to measure its torque output. These measurements were taken at different time intervals and recorded.

The same procedure as above was followed again except that the Brabender was charged with a formulation of 46.5 grams of GPPS and 3.5 grams of hexabromocyclododecane (HBCD).

Again, the same procedure was followed except that the Brabender was charged with a formulation containing 46.11 grams of GPPS, 3.5 grams of HBCD, and 0.39 grams of a stabilizer system comprising 0.14 grams of trimethylolethane, 0.07 grams of ETHANOX® 330 antioxidant (1,3,5-trimethyl-2,4,6-tris(3,5-di-tert-butyl-4-hydroxybenzyl)benzene) and 0.18 grams of Thermolite® T-20 [dibutyltin-bis(dodecamercaptide)] which is available from M&T Chemicals, Inc. of New Jersey.

FIG. 1 shows that the GPPS-HBCD formulation which used the stabilizer system of this invention maintained about 65% of the torque value obtained with neat GPPS at the same time interval. For an unstabilized GPPS-HBCD formulation, FIG. 1 shows that the torque values dropped to below 40% of the torque values obtained for GPPS and HBCD. Such a drop in torque values is a clear indication that the viscosity of the unstabilized GPPS-HBCD formulation was substantially degraded.

EXAMPLE II

The procedure of Example I was repeated except that the styrenic polymer was HIPS instead of GPPS. The particular thermoplastic formulations, torque values, in gram-meters, and the color observations are reported in the following Table.

TABLE

| Sample No. Time (Mins) | 1 MMK HIPS | | 2 MMK HIPS & 7 wt % HBCD[1] | | 3 MMK HIPS & 7 wt % HBCD[2] | | 4 MMK HIPS & 7 wt % HBCD[3] | | 5 MMK HIPS & 7 wt % HBCD[4] | | 6 MMK HIPS & 7 wt % HBCD[5] | |
|---|---|---|---|---|---|---|---|---|---|---|---|---|
| | tv | c | tv | c | tv | c | tv | c | tv | c | tv | c |
| 05 | 520 | white | 380 | tan | 410 | tan | 410 | tan | 420 | tan | 380 | tan |
| 10 | — | | 290 | dark tan | 310 | gray tan | 320 | gray tan | 320 | dark tan | 300 | gray tan |
| 15 | 530 | white | 240 | light brown | 260 | gray brown | 280 | gray brown | 300 | light brown | 270 | gray brown |
| 20 | — | | 210 | brown | 230 | brown | 250 | brown | 280 | brown | 240 | brown |
| 25 | 520 | white | — | | — | | 230 | brown | 250 | brown | 230 | dark brown |
| 30 | — | | — | | — | | 210 | dark brown | 220 | dark brown | 200 | dark brown |
| 35 | 500 | off white | — | | — | | — | | — | | — | |
| 45 | 490 | off white | — | | — | | — | | — | | — | |
| 55 | 470 | slight yellow tint | — | | — | | — | | — | | — | |
| 60 | 460 | slight yellow tint | — | | — | | — | | — | | — | |

| Sample No. Time (Mins) | 7 MMK HIPS & Stabilizer | | 8 MMK HIPS Stabilizer HBCD[1] | | 9 MMK HIPS Stabilizer HBCD[2] | | 10 MMK HIPS Stabilizer HBCD[3] | | 11 MMK HIPS Stabilizer HBCD[4] | | 12 MMK HIPS Stabilizer HBCD[5] | |
|---|---|---|---|---|---|---|---|---|---|---|---|---|
| | tv | c | tv | c | tv | c | tv | c | tv | c | tv | c |
| 05 | 550 | white | 460 | white | 450 | white | 470 | white | 430 | white | 460 | white |
| 10 | — | | — | | — | | — | | — | | — | |
| 15 | 530 | white | 430 | white | 440 | white | 470 | white | 410 | off white | 450 | white |
| 20 | — | | — | | — | | — | | — | | — | |
| 25 | — | | — | | — | | — | | — | | — | |
| 30 | 530 | white | 420 | off white | 430 | white | 420 | gray white | 420 | off white | — | |
| 35 | — | | — | | — | | — | | — | | — | |
| 45 | 520 | white | 410 | off | 410 | white | 440 | off | 410 | slight | 420 | off |

TABLE-continued

| | | | | | | | | | white | | yellow tint | | white |
|---|---|---|---|---|---|---|---|---|---|---|---|---|---|
| 55 | — | — | — | — | — | — | — | — | — | — | — | — | — |
| 60 | 520 | off white | 380 | off white | 420 | off white | 430 | off white | 380 | yellow tine | 430 | slight yellow tint |

MMK HIPS A high impact polystyrene product sold by Mitsubishi-Monsanto
Stablizer 0.35 wt % dibutyltin bis(lauryl mercaptide), 0.28 wt % trimethylol ethane and 0.14 wt % 1,3,5-trimethyl-2,4,6-tris(3,5-di-tert-butyl-4-hydroxybenzyl)benzene, all based upon the total weight of the thermoplastic formulation
HBCD[1] A hexabromocyclododecane product having a melting point of 175° C.-190° C.
HBCD[2] A hexabromocyclododecane product having a melting point of 185° C.-193° C.
HBCD[3] A hexabromocyclododecane product having a melting point of 198° C.-202° C.
HBCD[4] A hexabromocyclododecane product sold by Great Lakes Chemical Corporation
HBCD[5] A hexabromocyclododecane product sold by Dead Sea Bromine Company, Ltd.
tv torque value measured in gram-meters
c color by visual determination A comparison of the tv and color entries for Samples 2-6 and for Samples 8-12 shows that viscosity degradation, as compared against the control samples, (Samples 1 and 7), is by far the greatest for Samples 2-6 which did not include the stabilizer system of the invention. Also, the color degradation for Samples 2-6 was extreme, with a brown color being obtained only after 20 minutes. The stabilized samples, Samples 8-12, had colors which did not near the brown color despite 60 minutes of exposure to the test conditions.

I claim:

1. A styrenic polymer-based thermoplastic formulation which comprises:
   (a) general-purpose polystyrene or impact-modified polystyrene;
   (b) a flame retardant amount of a brominated cycloaliphatic compound; and
   (c) a thermal stabilizer system comprised of,
      (i) from about 2 to about 10 weight percent of a dibutyltin mercaptide stabilizer,
      (ii) from about 1 to about 3 weight percent of a hindered phenolic antioxidant, and
      (iii) from about 1.5 to about 6 weight percent of a polyhydroxy aliphatic compound which is capable of chelating metals which may be present in said thermoplastic formulation,
   said weight percentages being based on the weight of said brominated cycloaliphatic compound in the thermoplastic formulation.

2. The thermoplastic formulation of claim 1 wherein said brominated cycloaliphatic compound is hexabromocyclododecane.

3. The thermoplastic formulation of claim 1 wherein said brominated cycloaliphatic compound is tetrabromocyclooctane.

4. The thermoplastic formulation of claim 1 wherein said dibutyltin mercaptide is of the formula $(R)_2Sn(SR')_2$ wherein R is an alkyl group having 4 to 8 carbon atoms and R' is an alkyl group having 8 to 14 carbon atoms.

5. The formulation of claim 1 wherein said hindered phenolic antioxidant is 1,3,5-trimethyl-2,4,6-tris(3,5-di-tertbutyl-4-hydroxybenzyl).

6. The formulation of claim 1 wherein said polyhydroxy aliphatic has at least three hydroxy groups and 3 to 15 carbon atoms.

7. The formulation of claim 1 wherein said dibutyltin mercaptide is dibutyltin bis(dodecamercaptide), said hindered phenolic antioxidant is 1,3,5-trimethyl-2,4,6-tris(3,5-di-tert-butyl-4-hydroxybenzyl) and said polyhydroxy aliphatic is trimethylolethane.

8. The formulation of claim 7 wherein said dibutyl bis(dodecamercaptide) is present in an amount within the range of from about 4 to about 6 weight percent, said 1,3,5-trimethyl-2,4,6-tris(3,5-di-tert-butyl-4-hydroxybenzyl) in an amount within the range of from about 1.75 to about 2.25 weight percent and said trimethylolethane is present in an amount within the range of from about 2 to about 5 weight percent.

9. The thermoplastic formulation of claim 1 wherein said formulation additionally contains a synergistic amount of antimony oxide.

10. The formulation of claim 8 wherein said formulation additionally contains a synergistic amount of antimony oxide.

11. A styrenic polymer-based thermoplastic formulation which comprises:
   (a) general-purpose polystyrene or impact-modified polystyrene;
   (b) a flame retardant amount of a brominated cycloaliphatic compound; and
   (c) a stabilizing amount of a thermal stabilizer system comprised of,
      (i) dibutyltin mercaptide,
      (ii) a hindered phenolic antioxidant, and
      (iii) a polyhydroxy aliphatic compound which is capable of chelating metal which may be present in said thermoplastic formulation,
   said stabilizing amount providing that the viscosity and/or the color of said thermoplastic formulation more nearly equal the viscosity and/or the color of a thermoplastic formulation consisting essentially of (a) than does the viscosity and/or color of a thermoplastic formulation consisting essentially of (a) and (b) after being heated to about 200° C. for at least about five minutes.

* * * * *